United States Patent [19]
Shubin et al.

[11] Patent Number: 5,341,556
[45] Date of Patent: Aug. 30, 1994

[54] METHOD AND APPARATUS FOR MANUFACTURE OF REINFORCED PANELS

[75] Inventors: Jack A. Shubin, Monterey Park; Gene S. Oliver, Hemat, both of Calif.; Jeff J. Jerabek, Salt Lake, Utah

[73] Assignee: The United States of America as represented by the Secretary of the Air Force, Washington, D.C.

[21] Appl. No.: 28,711

[22] Filed: Mar. 9, 1993

Related U.S. Application Data

[63] Continuation of Ser. No. 725,726, Jun. 28, 1991, abandoned.

[51] Int. Cl.⁵ .......................... B25B 1/20; B23P 11/00
[52] U.S. Cl. ........................................ 29/448; 29/559
[58] Field of Search .............. 29/448, 559, 423, 525.2, 29/897.32, 281.1; 244/124; 269/37, 43, 130, 131

[56] References Cited

U.S. PATENT DOCUMENTS

| | | | |
|---|---|---|---|
| 2,430,438 | 11/1947 | Watter et al. | 29/148.2 |
| 2,451,454 | 10/1948 | Watter | 29/148.2 |
| 2,567,124 | 9/1951 | Roberts | 244/124 |
| 3,643,900 | 2/1972 | Maloney | 244/123 |
| 3,827,661 | 8/1974 | Ryan et al. | 244/123 |
| 4,894,903 | 1/1990 | Woods | 29/448 |

Primary Examiner—Joseph M. Gorski
Attorney, Agent, or Firm—Donald J. Singer; Thomas C. Stover

[57] ABSTRACT

Method for tack free positioning of aircraft panel components for subsequent fastening is disclosed. Thus according to the invention, an assembly jig is provided which has a frame, including a plurality of lower contour boards, which pneumatically clamp a plurality of stringers thereon, which stringers hold a panel sheet thereover and on the other side of such sheet, a plurality of upper contour boards. Means are provided for closing the upper contour boards against the sheet, stringers and lower contour boards, to clamp and also to drape-form the sheet against the stringers in a desired contour in such jig assembly so that such components can be subsequently fastened without pretacking. The jig assembly and clamped panel components are then transported to a riveting stage where panel and stringers are riveted together in rivet rows extending across such panel, which rows are spaced laterally between the upper and lower contour boards. The panel assembly is then lifted off the assembly jig, e.g. by overhead crane and transported for assembly, e.g. to an aircraft while the assembly jig is transported from the riveting stage back to its previous location for further panel assembly.

3 Claims, 10 Drawing Sheets

METHOD AND APPARATUS FOR MANUFACTURE OF REINFORCED PANELS

STATEMENT OF GOVERNMENT INTEREST

The invention described herein may be manufactured and used by or for the Government for governmental purposes without the payment of any royalty thereon.

This application is a continuation of application Ser. No. 07/725,726, filed Jun. 28, 1991, and now abandoned.

BACKGROUND OF THE INVENTION

1. Field of the Invention

This invention relates to method and apparatus for manufacture of panels, particularly for assembly and fastening

2. The Prior Art

Assembling and fastening together elements of reinforced panels is a multi-step process. For example, elements of an aircraft panel, such as a wing panel, include, e.g. an aluminum web or sheet, a plurality of reinforcing members or stringers and fastening means therefor. Once these elements are located, a problem lies in the high man-hour requirements needed to prepare and position them for assembly in an automatic fastening operation such as found in modern aircraft assembly plants. Such preparation process would normally require the manual drilling and installation of many, (e.g. 500) temporary fasteners (tacking) to hold the reinforced panel members together, as guided by a jig for that purpose.

However the drilling of the panel and stringers even for temporary fasteners, results in fragments or burrs being generated at the drilling points, including at the contact faces of the stringers and panel. Accordingly, after panel assembly and such drilling and tacking, the tacks must be removed, the elements disassembled and the fastening apertures deburred, after which the elements are reassembled and the tacks are reinserted in the drilled apertures to refasten panel and stringers together.

After such (doubly) laborious tacking and retacking process, the wing reassembly is then removed from the assembly jig and transferred to a fastening stage to be fastened, e.g. by rivets.

In the prior art, several patents relate to aircraft structures and methods of assembly U.S. Pat. No. 3,827,661 to Ryan et al. (1974), U.S. Pat. No. 3,643,900 to Maloney (1972), U.S. Pat. No. 2,567,124 to Roberts (1951), U.S. Pat. No. 2,430,438, to Watter et al. (1943) and U.S. Pat. No. 2,451,454 to Watter (1948). Although these patents relate to the assembly of air foils and at least one, the Ryan reference, mentions the use of quick-release fasteners to hold the assembly in alignment before riveting same, none appears to take notice of the tacking problem, let alone suggest a solution therefor.

The above-mentioned assembly and positioning of panel elements in a jig, normally requires a considerable number of man-hours for installing what are only temporary fasteners, i.e. tacking as noted above.

Accordingly there is a need and market for a jig assembly method and apparatus that omits or eliminates tacking in the assembly of reinforced panels and otherwise obviates the above prior art shortcomings.

There has now been discovered method and apparatus for jig assembly and positioning of reinforced panels that employs a "no tack" concept that significantly reduces the man-hour costs in jig assembly preparation, for subsequent permanent fastening of reinforced panels, including aircraft panels.

SUMMARY OF THE INVENTION

Broadly the present invention provides a panel assembly jig (AJ) for tack-free positioning of panel compartments for subsequent fastening comprising, a frame which includes a plurality of lower contour boards for holding a plurality of stringers thereon and a panel sheet on said stringers, a plurality of upper contour boards on the other side of said sheet, means for closing said upper contour boards against said sheet, stringers and lower contour boards to clamp and drape-form said sheet against said stringers in a desired contour so that they can be subsequently fastened without pre-tacking.

The invention further provides a panel assembly jig in which the panel components are assembled in a desired position at a first location, clamped in place and then the jig and so-clamped panel components are moved to a second location for fastening such panel components to form a reinforced panel after which the clamps are opened to release such panel from the jig.

The invention also provides a method for tack-free positioning of panel components for subsequent fastening comprising, positioning a plurality of stringers on lower contour boards, positioning a panel sheet on such stringers, positioning upper contour boards against the other side of such sheet, closing such upper contour boards against such sheet, stringers and lower contour boards, to clamp and drape-form such sheet against such stringers in a desired contour so that they can be subsequently fastened into a reinforced panel without a pre-tacking step.

BRIEF DESCRIPTION OF THE DRAWINGS

The invention will become more apparent from the following detailed specification and drawings in which.

DESCRIPTION OF PREFEERRED EMBODIMENT

Figure 1:
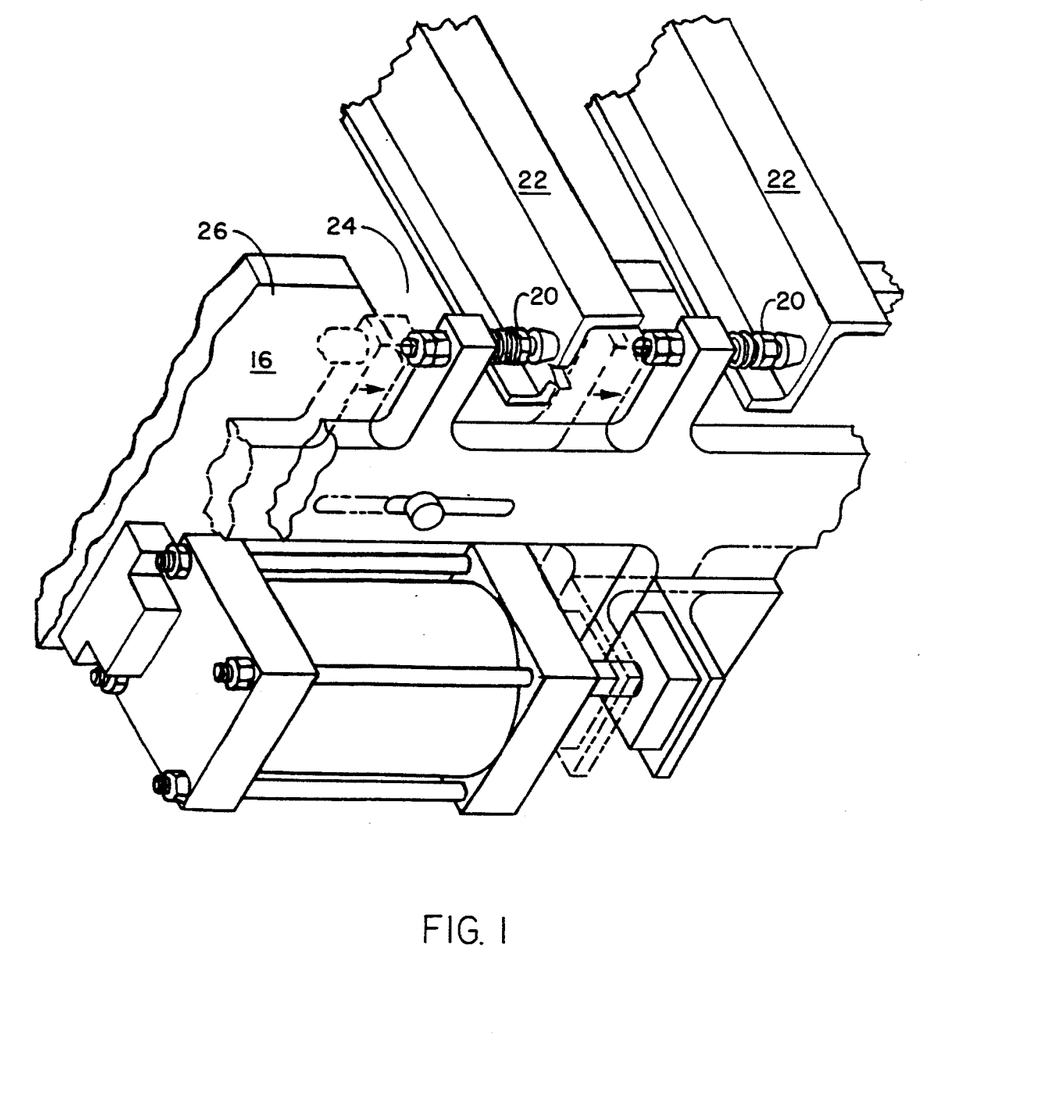
FIG. 1 is on an enlarged fragmentary, perspective view of components of the assembly jig (AJ) embodying the present invention.
Figure 5:
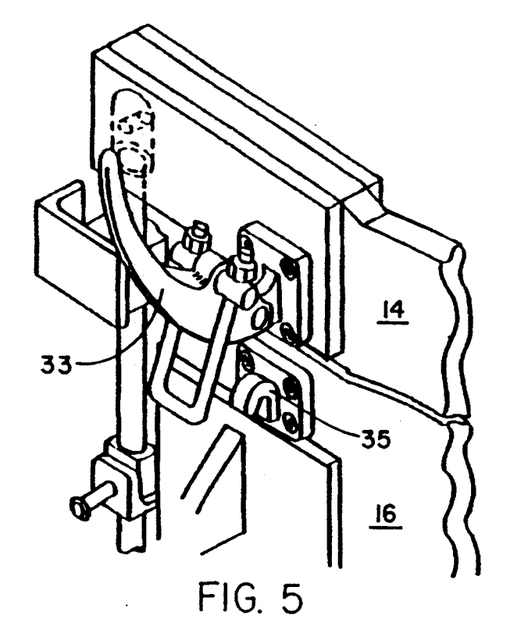
FIG. 5 is an enlarged fragmentary perspective view of a component of the AJ of the invention shown, generally in FIG. 3.
Figure 6:
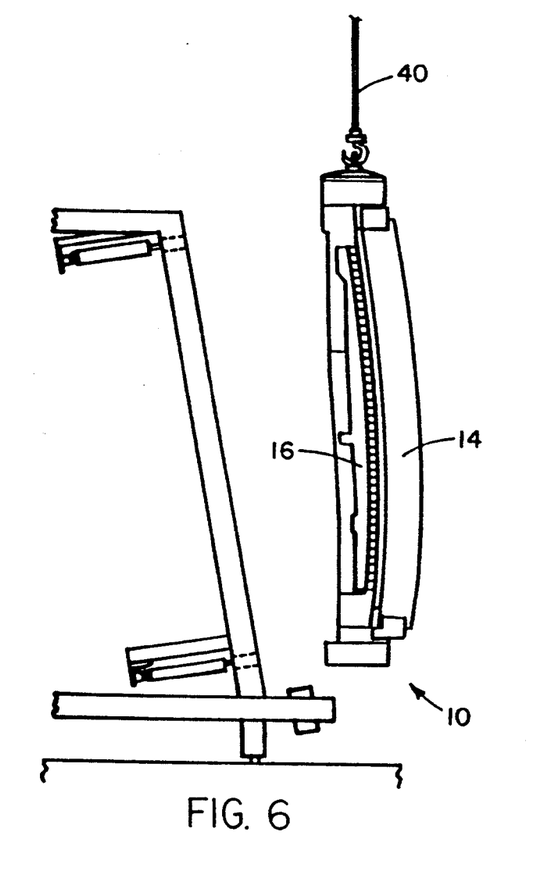
FIG. 6 is an end elevation view of the AJ of FIG. 2, in motion.
Figure 7:
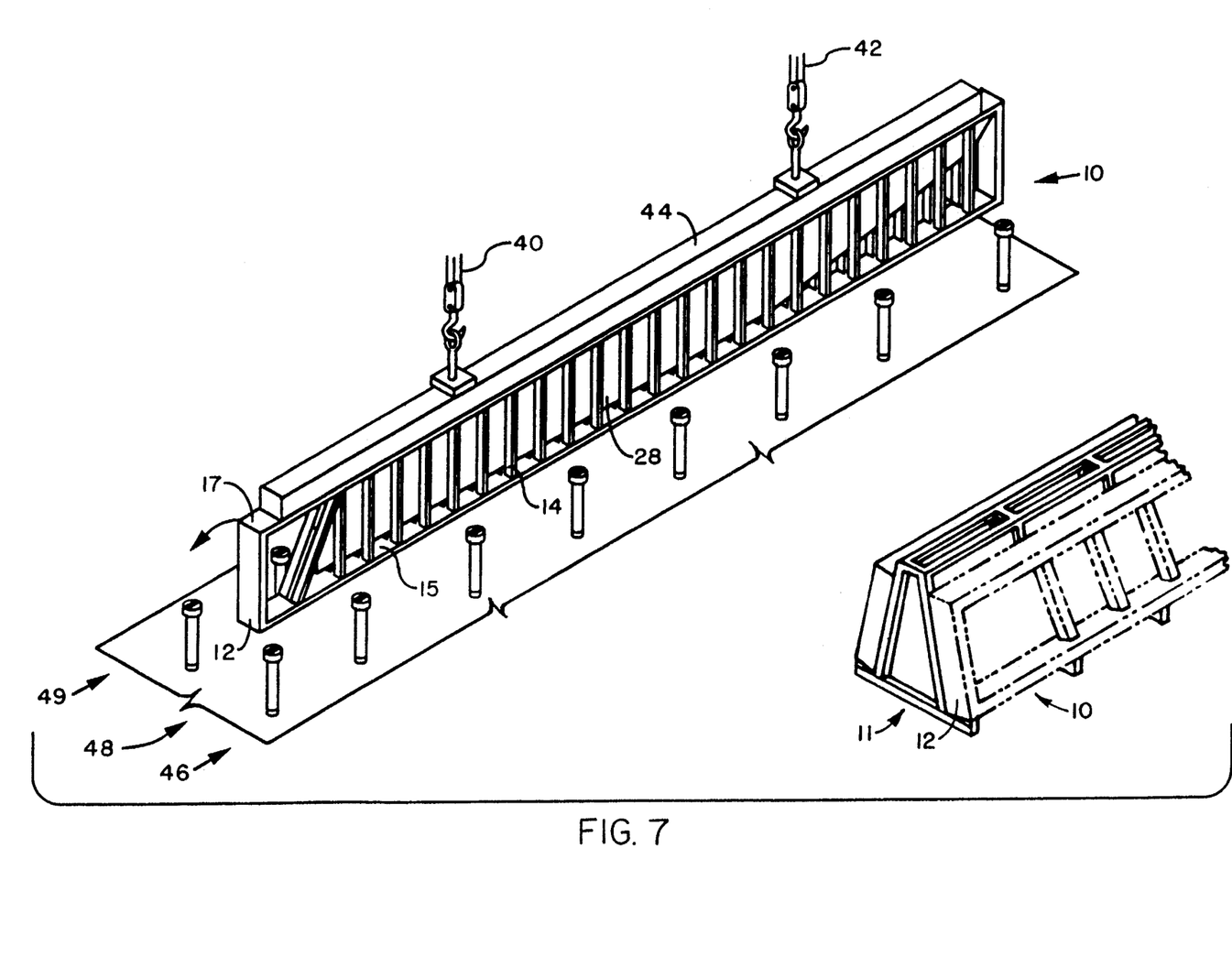
FIG. 7 is a perspective view of the AJ of the invention in further motion.
Figure 10:
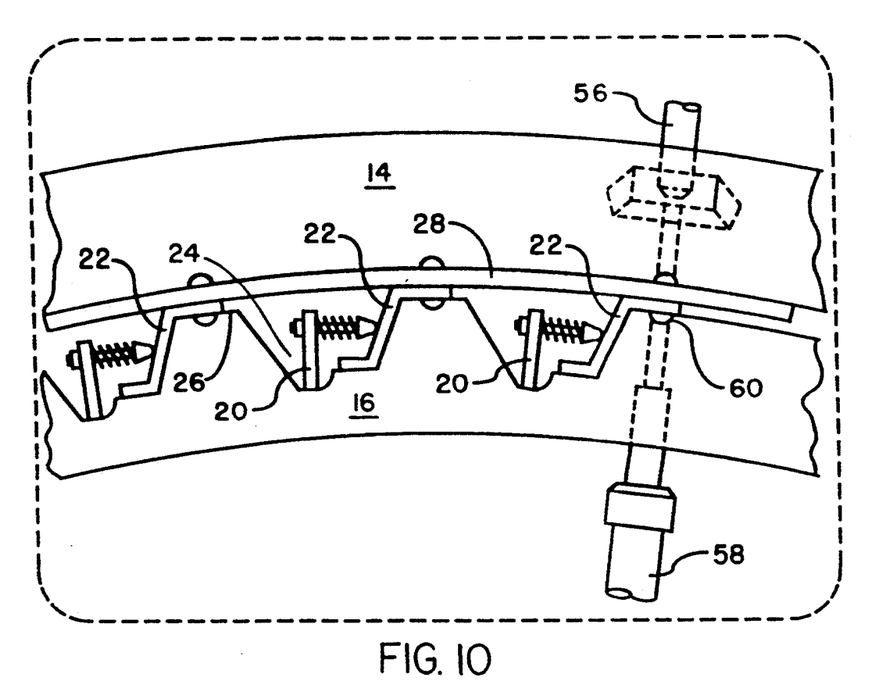
FIG. 10 is an enlarged fragmentary elevation view of components of the AJ of the invention shown generally in FIG. 9.

Referring now in more detail to the drawings, assembly jig (AJ) 10, embodying the invention, shown generally in FIGS. 6 and 7, includes a frame 12 having upper contour boards 14 and lower contour boards 16, such as shown in FIGS. 2, 3, 5, 6 and 7, the lower contour board 16 having pneumatically shiftable clamps 20 mounted thereto, as shown in FIGS. 1 and 10.

Figure 2:
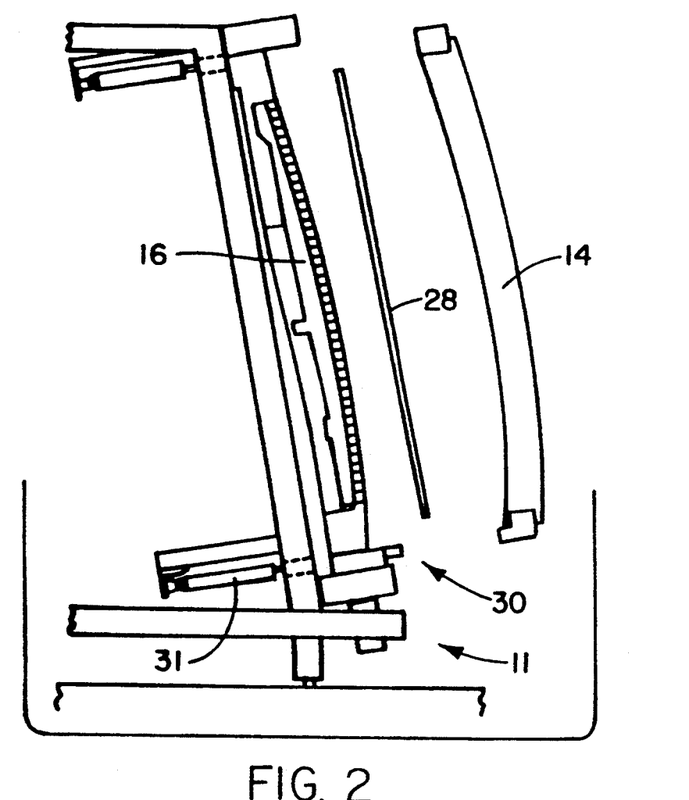
FIG. 2 is an end elevation view of the AJ embodying the present invention.

The assembly jig 10 is initially mounted in a stand 11 with the frame 12 and lower contour boards 16, with associated clamps 20, already in place, as shown or indicated in FIGS. 7 and 2. Reinforcing bars or stringers 22 in notches 24 of the lower contour board 16 and the clamps 20 thereat, are activated to position such stringers 22 on the tops and sides of the ridges 26 of the lower contour board 16, as shown in FIGS. 1 and 10 and indicated in FIG. 2. Next the skin panel 28 is positioned against the tops of the stringers 22, as urged from behind by upper contour boards 14, which are positioned thereover in contact with pull-down actuators 30, as shown or indicated in FIG. 2.

The upper contour boards 14 are attached to the pull-down actuators 30, as described below, which then retract into the housing 31 thereof and apply compressive force, e.g. 5,000 lbs. or more of force that is required to drape-form the skin panel 28 over the contours of the shaped array of stringers in close engagement therewith, as indicated in FIG. 2 and shown in FIGS. 3 and 6.

At this point, when the panel is fully draped, the upper contour boards are manually locked to lower contour boards 16, by buckle assembly 33 and 35, as shown in FIG. 5. Then each pull-down rod 32 is detached from the actuator bracket 34 by removal of locking pin 36 therefrom, as shown in FIG. 4. Of course such actuator components are reattached in the reverse order, per FIG. 4, when drape-forming the next skin panel assembly.

Overhead crane hook assemblies 40 and 42 are then attached to the so-buckled AJ and its draped assembly of stringers and skin panel (clamped in fixed position within) and the AJ is then transported by an overhead crane (not shown), such crane hooks 40 and 42 and (optionally), a crane boom 44, to a fastening stage 46, as shown in FIGS. 6 and 7.

Figure 8:
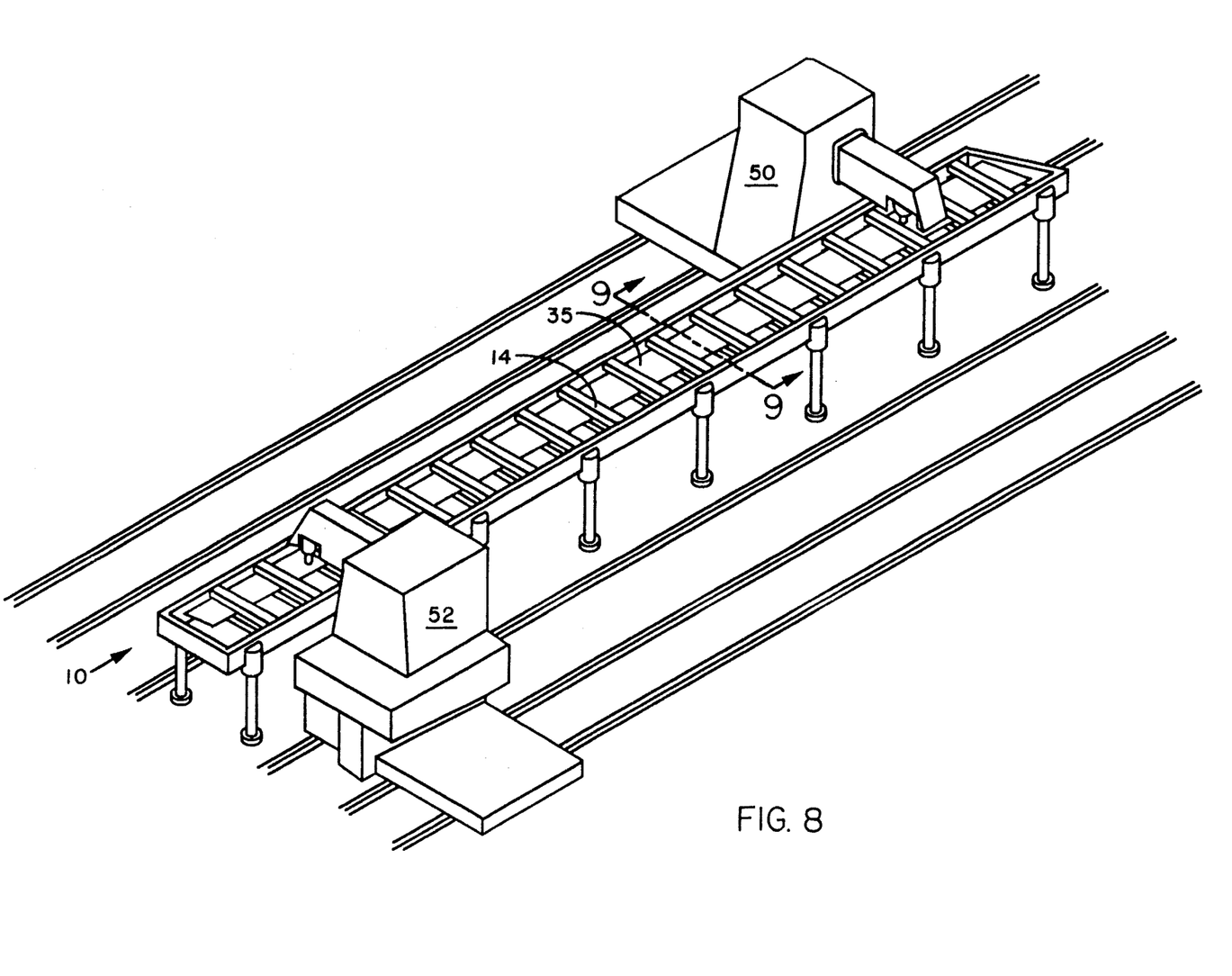
FIG. 8 is a perspective view of the AJ of FIGS. 6 and 7, in position for a fastening operation.
Figure 9:
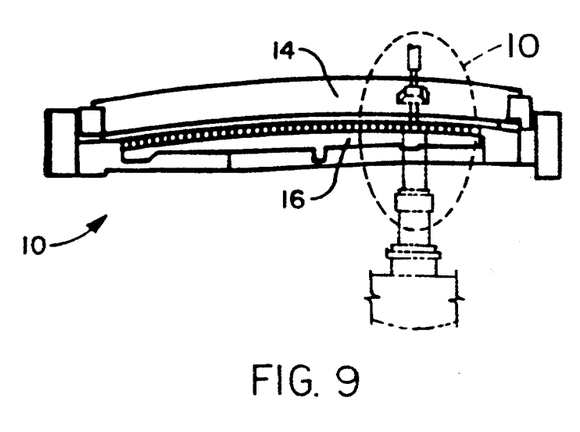
FIG. 9 is an end elevation view of the AJ of FIGS. 6, 7 and 8 in position for a fastening step, taken on lines 9—9 of FIG. 8, looking in the direction of the arrows.

The fastening stage 46 has a front row of posts 48 and a rear row of posts 49 and the assembly jig 10 is lowered such that the bottom rail (of the frame) 15 rests on the front row of posts 48 and the upper rail 17 of such frame 12, swings down onto the rear row of posts 49, with the panel 28 and upper contour boards 14 facing upwardly as indicated in FIG. 7. The crane boom 44 is disengaged from the frame 12 of the AJ 10 and moves on. Thereafter one or more large riveting machines, e.g. machines 50 and 52, move into position with jaws that fit over and under the AJ 10 and panel assembly 35, as shown in FIG. 8 and indicated in FIGS. 9 and 10. That is, each automatic riveting machine, e.g. "drivmatic" machine 50 has jaw members defined by retractable spindle quill 56 and anvil 58, shown in FIG. 10 and indicated in FIG. 9, which close upon each stringer 22 and the panel 28 and clamp them even more tightly together. Then an aperture is drilled through the so clamped stringer and panel portion and a rivet 60 is inserted therethrough, which rivet is then flatened at each end, to tightly fasten stringer and panel portion at spaced points along each such stringer 22, as indicated in FIGS. 10 and 3, where future rivet locations 62 are indicated. For further description of the "drivmatic" riveting machine, shown or indicated in FIGS. 8, 9 and 10 hereof, see a related patent application entitled "Method and Apparatus For Manufacture of Aircraft Components" filed in the U.S. PTO on Nov. 28, 1990 by Trevor D. Whiteside, which application is incorporated herein by reference.

Thus as shown in FIG. 10, the stringers and panels are doubly clamped by pneumatic clamps 20 and upper and lower contour boards 14 and 16, which avoids the tacking the deburring and reassembly steps so prevalent in the prior art. The so-clamped panel assembly members are then further clamped together by the anvil 58 and spindle quill 56 of the "drivmatic" machine for drilling and riveting, again without the need for a deburring step as indicated in FIG. 10.

Of course while riveting of the panel and stringers can be readily accomplished by the drivmatic machine 50 and 52 between the upper contour boards 14 as shown in FIG. 8, there is also a need to rivet such components together at or near such contour board locations for added panel assembly strength. This means that the upper contour boards 14 must be unbuckled and lifted off the draped skin panel to permit shifting of such partially fastened skin panel away from the lower contour boards. But how to do this without allowing the so-shaped panel to spring back to its cross sectionally flat shape? This problem is solved by another aspect or novel feature of the present invention as follows.

Figures 3, 4:
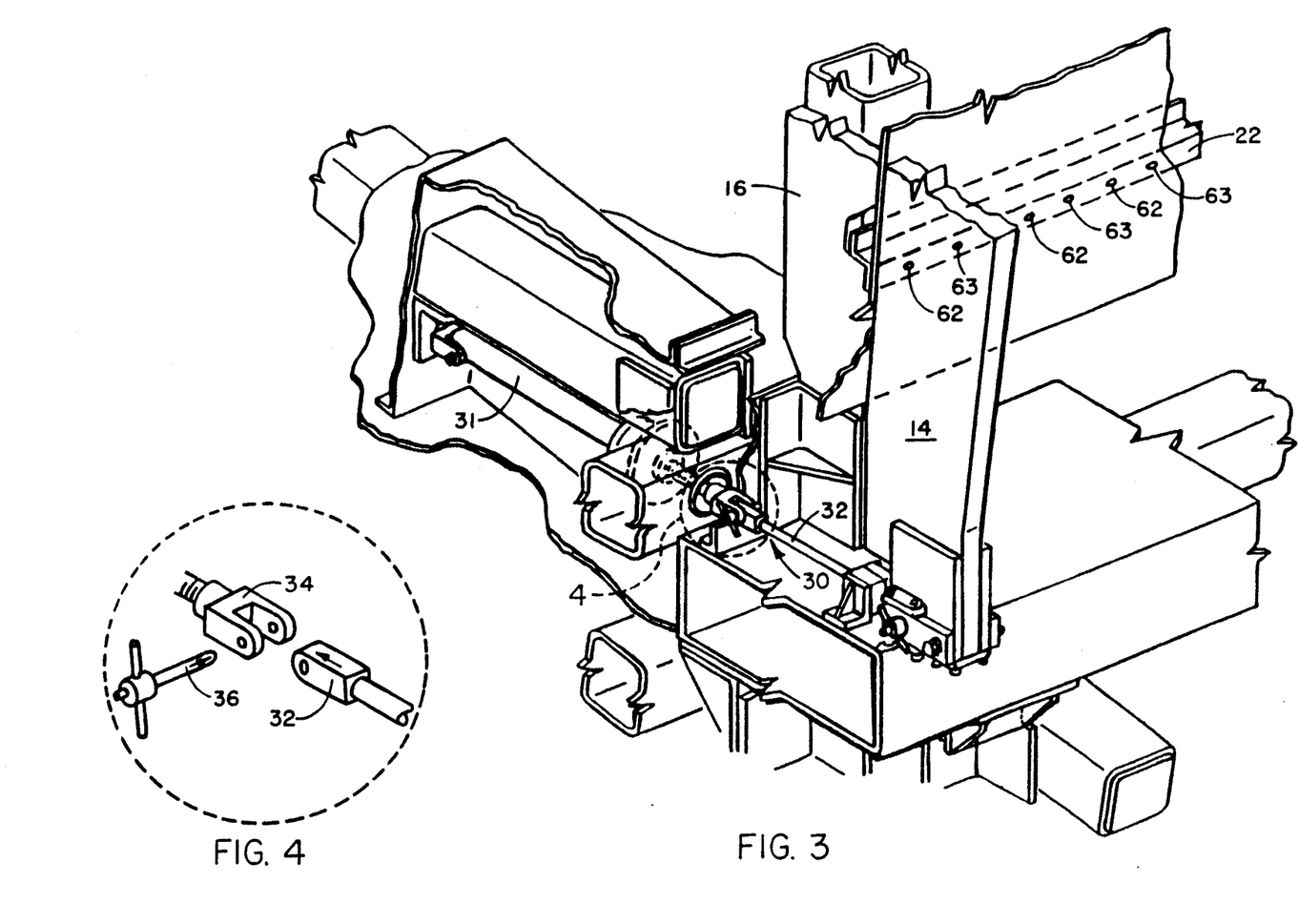
FIG. 3 is an enlarged fragmentary, perspective view of further components of the AJ embodying the present invention.
FIG. 4 is an enlarged exploded fragmentary perspective view of a component of the invention shown in FIG. 3.

In the drilling and riveting of stringer to panel described above, some drilled holes or apertures are left vacant or unfilled by a rivet, e.g. every other one, as indicated in FIG. 3, where small circles 62 denote rivet locations and small circles 63 denote vacant drilled hole locations. Then heavy bars of appropriate contour or "strong backs" 66 having eye-tabs 68, are positioned on the panel 35 as shown in FIG. 11, between the upper contour boards 14, shown in FIG. 8, with the eye-tabs 68 thereof over the unriveted or vacant holes 63 (of FIG. 3) and bolts are inserted through such eye holes 68 and through such vacant holes 63, which bolts extend through the stringers 22, beneath the panel 28 and the strong backs 66 of desired contour are thus bolted to the draped panel 28 and the stringers 22 therebeneath, into a tight panel assembly of desired contour as shown or indicated in FIG. 11.

Figure 11:
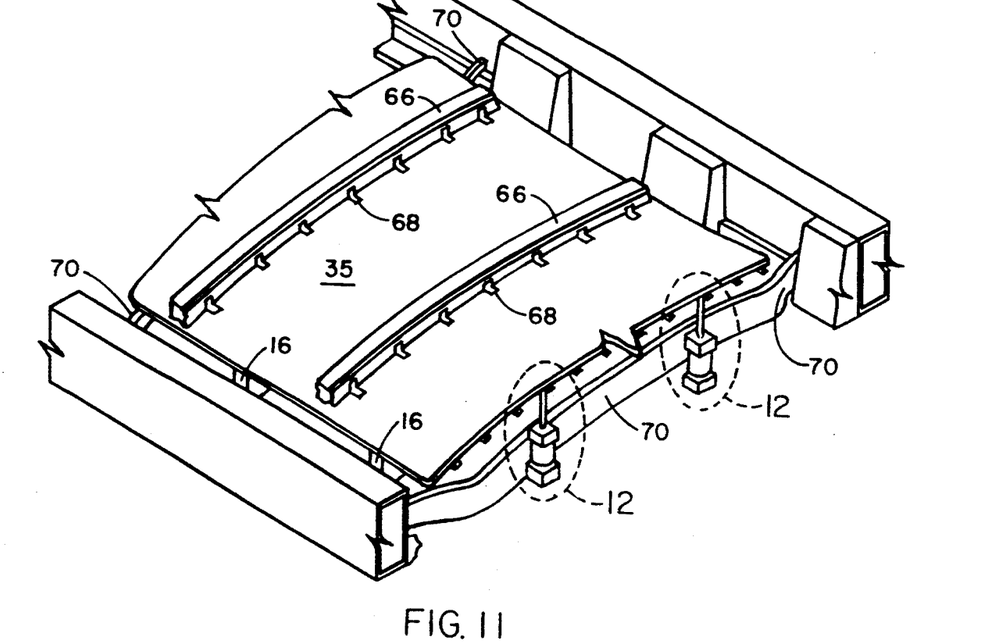
FIG. 11 is an enlarged fragmentary perspective view of a portion of the AJ shown generally in FIG. 8.
Figure 12:
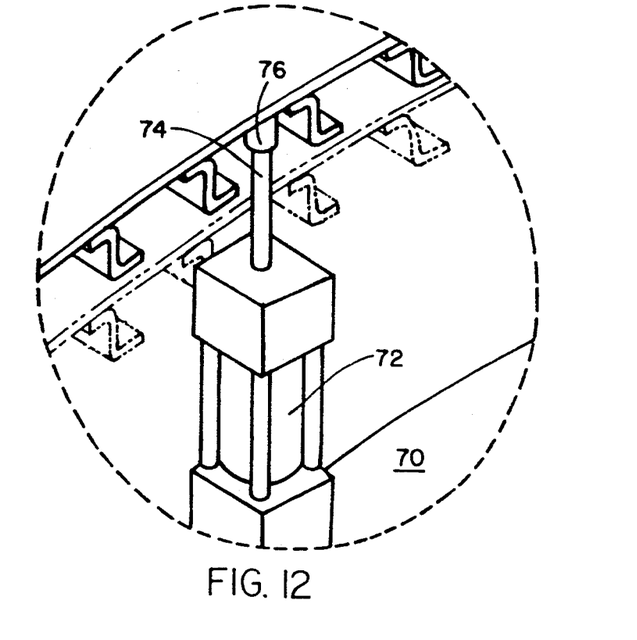
FIG. 12 is an enlarged fragmentary perspective view of components of the AJ portion shown in FIG. 11.

The upper contour boards 14 are then unbuckled, from the AJ 10, e.g. of FIG. 8 and removed therefrom leaving the assembly shown in FIG. 11. The problem remains of how to shift the so-partially riveted panel assembly, since the stringers 22 still rest in the grooves 24 of the lower contour boards 16, as shown in FIGS. 1 and 10. To solve this problem, Thompson rail boards 70, slideably mounted on rails between each pair of lower contour boards 16 and slideable therebetween, are moved by hand to a point intermediate each pair of lower contour boards (which can be, e.g. 48 in. apart), which rail boards 70 have a pair of pneumatic cylinders 72 thereon, which each raise and lower a lifting pod 74 with a rubber tip 76 thereon, as shown in FIGS. 11 and 12.

Figure 13:
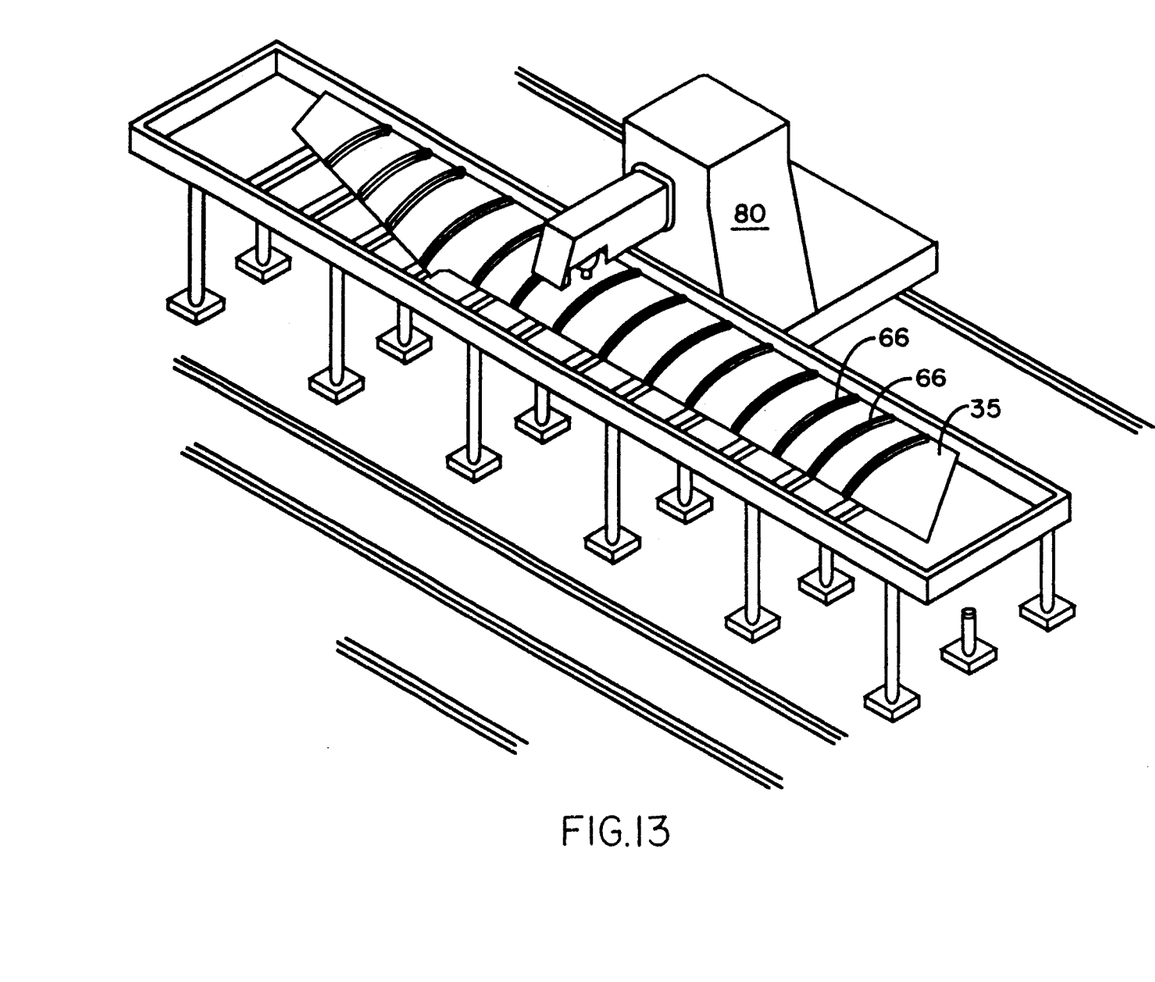
FIG. 13 is a perspective view of the AJ of the invention in further operation and FIG. 14 is a perspective elevation view of a reinforced panel made according to the present invention, incorporated into a wing box.

In operation, the air cylinders 72 are activated, causing the lifting pods 74 to rise and elevate the panel assembly 35, with strong backs 66, e.g. 3 inches, so that the stringers 22 clear the grooves 24 of the lower contour boards 16. Then the so elevated panel assembly 35 is manually pushed, e.g. about 24 inches so that most if not all of the rivet lines and strong backs are moved from their former intermediate positions to those near or over the lower contour boards 16 and the unriveted portions of panel assembly 35, which had been between upper and lower contour boards, are now shifted intermediate thereof for ready access by a riveting machine e.g. drivmatic machine 80, which can now complete its respective rivet lines between each pair of strong backs 66, as shown or indicated in FIG. 13. During such riveting operation for convenience, the panel assembly 35 is maintained in its elevated position by the Thompson rail board lifting pods 74 as the drivmatic anvil 58 and spindle 56, provide their own counter pressure, as indicated in FIG. 10.

Figure 14:
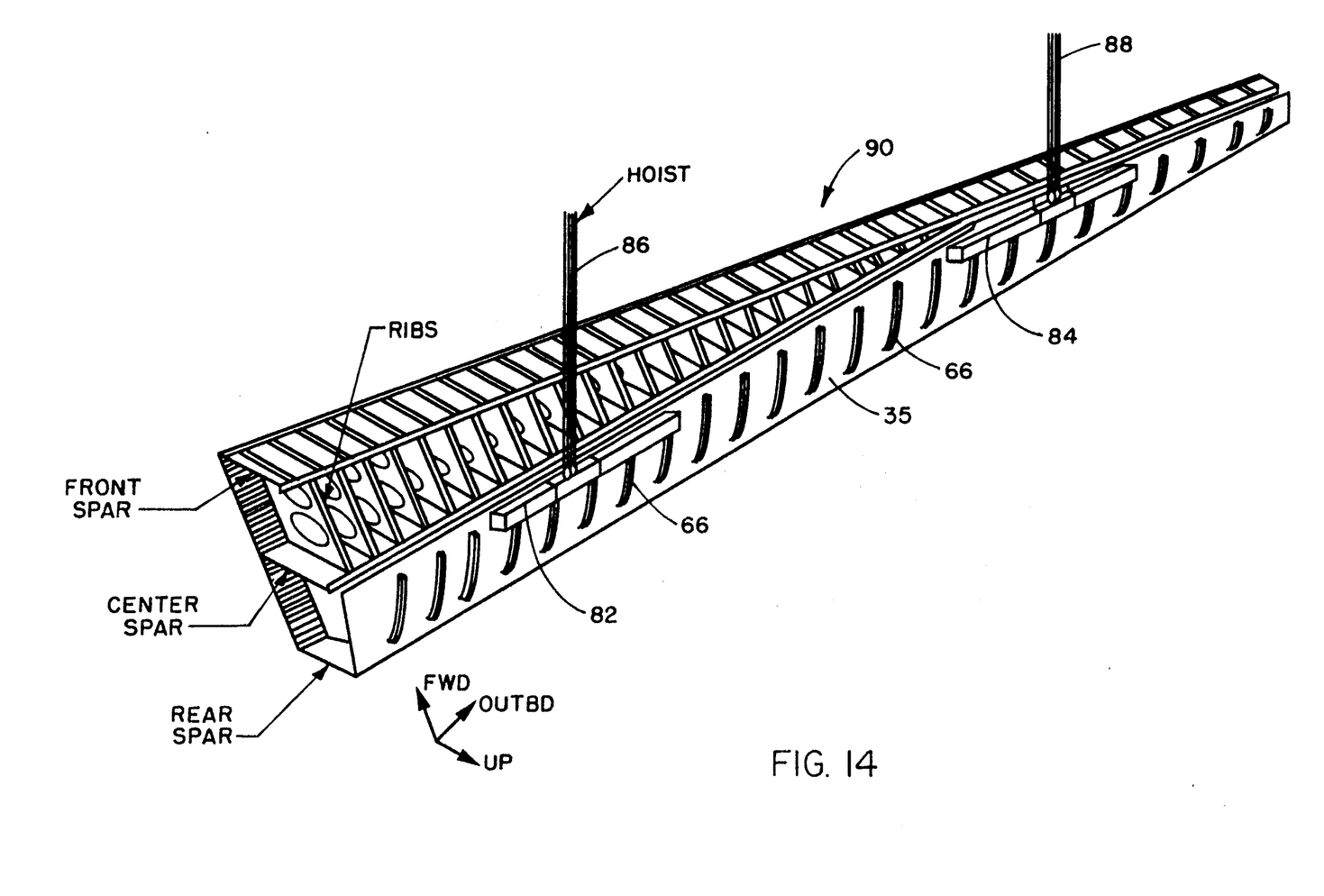

Thereafter cross beams 82 and 84 are attached to bolt holes (not shown) in the ends of several strong backs 66 and the panel assembly 35 is lifted by crane-hook assemblies 86 and 88 out of the AJ and deposited onto wing box 90, for fastening thereto, as shown in FIG. 14. During or after such operation, the strong backs 66 and the cross bars 82 and 84 are removed and the overall assembly procedure of the invention is repeated, e.g. beginning with FIGS. 1 and 2 hereof.

Thus the wing panel assembly method of the present invention is a double clamping procedure with pneumatic clamps 20 and upper and lower contour boards (14 and 16), which avoids the laborious pre-tacking of panel assembly, disassembly thereof, deburring of all tacking holes, and re-assembly (for riveting) steps of the prior art. In addition a large wing skin size, e.g. over 100 feet long, is normally pre-formed in the prior art, which adds further to the delivery time and costs of such panel assembly.

Accordingly to the present invention, the panel components of skin and stringers are clamped together and maintained in the AJ throughout the assembly and fastening process. Further as previously noted, the skin panel 28 is draped by the pulldown actuated contour boards to shape the skin panel into the desired contour at the same time the components of skin and stringers are clamped together for the subsequent fastening step. Thus the clamping and panel shaping method of the invention in the AJ as noted previously, saves not just tacking and deburring steps but also the costly requirement of panel pre-forming (and a considerable time savings as well).

Further once the panel assembly is riveted it and the AJ can be rapidly transported away, freeing up the drivmatic machine for other operations.

Another labor savings is that the pneumatic stringer clamps can be actuated together with push button control rather than manually clamping and unclamping, say, 200 manual clamps, e.g. 10 stringer clamps per each of 20 lower contour boards equals 200 clamps for 10 panel stringers.

Another novel feature of the method of the invention is the use of contour preserving strong backs for panel assembly shifting and intermediate riveting therebetween, as discussed above.

The methods of the present invention can be employed for various reinforced panel assemblies for aircraft wings, aircraft bodies or other aircraft components, as well as various other panel structures, including other vehicles used on land, sea, air or in space or for buildings or other structures, as desired within the scope of the present invention.

Advantageously, as noted above, the panel rivets are flatened at both ends and those at the upper or skin side are shaved or sawn close to the skin, having been counter-sunk on the upper side beforehand for aerodynamic or windfoil purposes.

What is claimed is:

1. A method for tack-free positioning of a panel sheet and stringers, and subsequent fastening thereof comprising the steps of, positioning a plurality of stringers on lower contour boards in an assembly jig, positioning a panel sheet on said stringers, positioning upper contour boards on said panel sheet, closing said upper contour boards against said panel sheet, stringers and lower contour boards, thereby clamping and drape-forming said panel sheet against said stringers in a desired contour, moving said assembly jig along with said lower contour boards, stringers, panel sheet and upper contour boards to a fastening station, fastening said panel sheet to said stringers such that said panel sheet remains in said desired contour, opening said upper contour boards and removing the fastened panel sheet and stringers from said upper and lower contour boards, so that said upper and lower contour boards are freed for re-use in positioning subsequent panel sheets and stringers.

2. The method of claim 1 wherein said fastening step includes drilling rivet holes through said panel sheet and stringers and riveting said panel sheet and stringers together at certain of said holes at locations laterally between said upper and lower contour boards thereby forming a panel assembly, which fastening step further includes positioning reinforcing bars of desired panel contour across said panel assembly and above said rivet holes and bolting said bars through certain other of said holes to said panel sheet and stringers, thereby securing the desired contour of said panel assembly, and wherein said opening step includes detaching and lifting said upper contour boards from said panel assembly so that said panel assembly can be moved relative to said assembly jig while preserving the desired contour of said panel sheet.

3. The method of claim 2 wherein said removing step includes elevating said panel assembly relative to said lower contour boards and shifting said panel assembly longitudinally and thus laterally relative to said lower contour boards, and further riveting said panel sheet and stringers across said panel sheet at locations previously near said contour boards thereby further fastening said panel sheet to said stringer.

* * * * *